United States Patent
Meyer

(10) Patent No.: US 6,581,156 B1
(45) Date of Patent: Jun. 17, 2003

(54) METHOD FOR RECORDING A DATA STATE IN A DATA PROCESSING SYSTEM

(75) Inventor: Roland Meyer, Augsburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,520

(22) PCT Filed: Sep. 1, 1999

(86) PCT No.: PCT/DE99/02738

§ 371 (c)(1),
(2), (4) Date: Mar. 19, 2001

(87) PCT Pub. No.: WO00/17754

PCT Pub. Date: Mar. 30, 2000

(30) Foreign Application Priority Data

Sep. 18, 1998 (DE) ......................................... 198 42 801

(51) Int. Cl.[7] ................................................ G06F 9/44
(52) U.S. Cl. ........................ 712/244; 711/161; 711/165; 714/48; 714/49; 714/57
(58) Field of Search ................................ 711/161, 162, 711/165; 714/6, 13, 48, 49, 57; 712/244

(56) References Cited

U.S. PATENT DOCUMENTS 4,686,620 A    8/1987  Ng 5,790,777 A    8/1998  Uzuta et al.

FOREIGN PATENT DOCUMENTS

WO    WO 95/192002    7/1995

OTHER PUBLICATIONS

IBM Technical Disclosure Bulletin—vol. 40 No. 12 Dec. 1997 pp. 111–112.

IBM Technical Disclosure Bulletin vol. 38 No. 08 Aug. 1995 pp. 309–310.

Faultmanagement Werkzeug zur Analyse von Speicherabzugen pp. 166–168; Jun. 1995.

*Primary Examiner*—Hiep T. Nguyen
(74) *Attorney, Agent, or Firm*—Bell Boyd & Lloyd LLC

(57) ABSTRACT

A method for recording the data state in a data processing system when an exceptional situation determined by prescribed characteristics is reached for a triggering program in the data processing system. For this purpose, at least one relevant data set which is at least indirectly affected by an access operation by the triggering program and is intended for subsequently deducing the circumstances leading to the exceptional situation is selected on the basis of a prescribed rule, and a recording copy of the content of the at least one relevant data set is then created in a form which permits transfer to another data processing system independently of the triggering program.

7 Claims, 3 Drawing Sheets

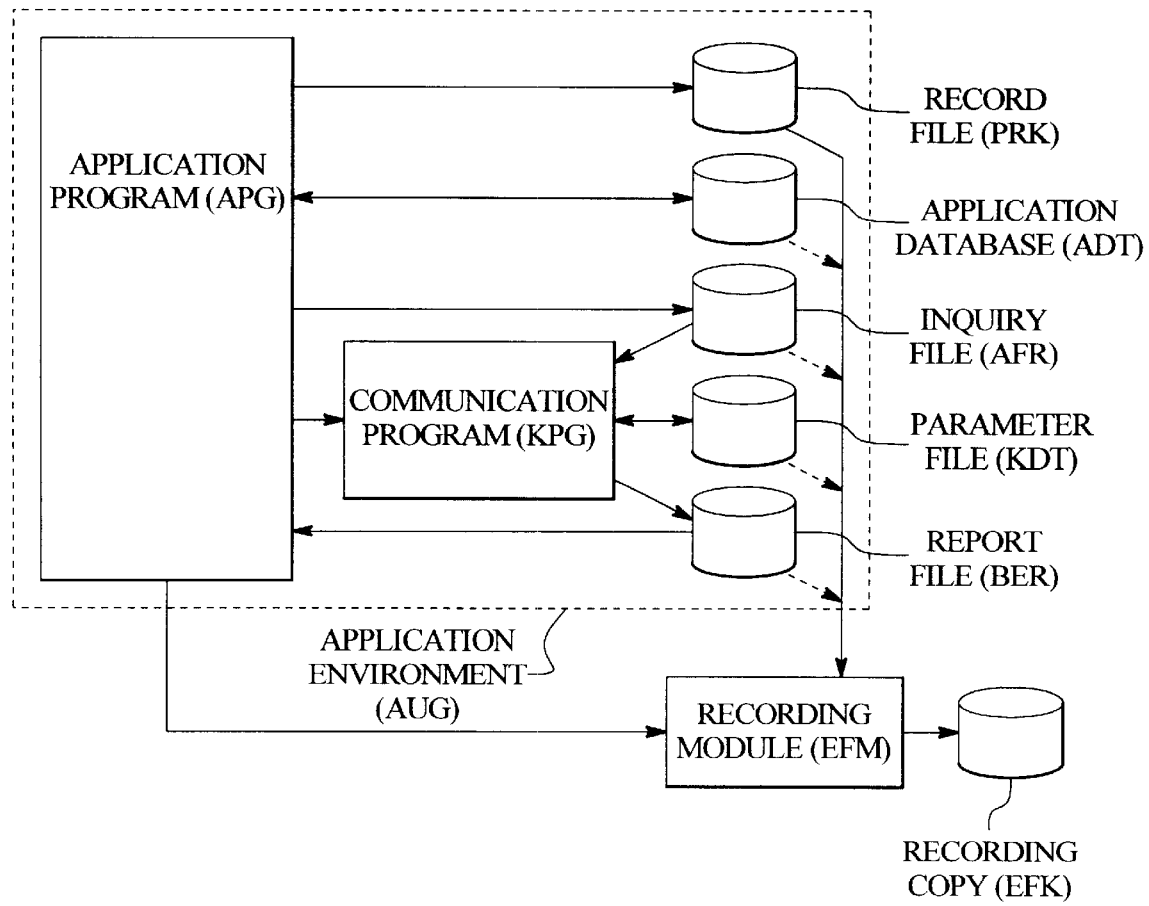
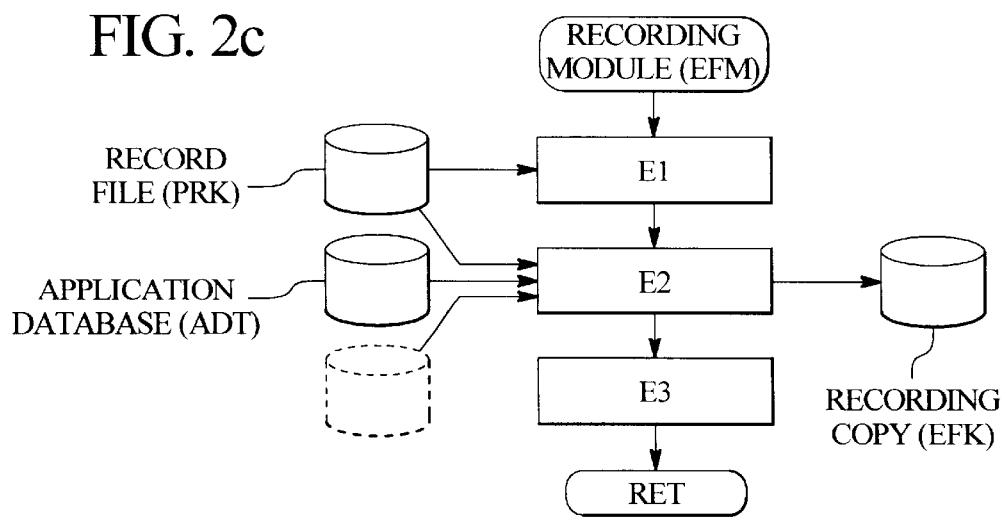

METHOD FOR RECORDING A DATA STATE IN A DATA PROCESSING SYSTEM

BACKGROUND OF THE INVENTION

1. Field of the Invention

The present invention relates to a method for recording the data state in a data processing system in which at least one program is executed and, in this context, at least one data set within one or more data memories is accessed, where an exceptional situation determined by prescribed characteristics is reached in a triggering program, and at least one relevant data set which is at least indirectly affected by an access operation by the triggering program and is intended for subsequently deducing the circumstances leading to the exceptional situation is selected on the basis of a prescribed rule.

2. Description of the Prior Art

Data processing systems frequently operate with a number of files or other data sets, e.g. the data on a data medium, in a database or a stipulated subset thereof. The data in these files, which is also understood to mean data sets in general below, in a data processing system can be read, processed and written back to files by programs executed on the data processing system. During execution of a program, a situation may arise, at a wide variety of points in the program execution, in which it is not appropriate for the program to continue. Such exceptional situations may arise, for example, when erroneous or unexpected data sets arise or on account of logical errors in the program structure. The occurrence of an exceptional situation makes it necessary to analyze the circumstances which have led to this situation. This requires that the exceptional situation, including the information from all the files used, be recorded as accurately as possible.

In many cases, the analysis is not performed by the user, but rather by the manufacturer of the data processing system or of the programs designed for it. In this case, the relevant files need to be saved by the user, possibly combined and sent to the manufacturer so that the latter can determine the causes of the exceptional situation. Even if the analysis of the exceptional situation is performed by the user or at the site of the data processing system, it is helpful if the data profile for the relevant files is recorded and stored. The reason for this is that, after recording, the user can continue to work on the data processing system at least using another application. In many cases, it is necessary to record a situation because the predominant part of data processing is not directly affected by the exceptional situation and, thus, is not interrupted. This as may be the case, for example, on a multiprocess or multiuser system, which is why the state of the relevant files is also variable after the occurrence of the exceptional situation.

With situation recording, particularly when it is done "manually" by the user, the problem often arises that, between the exceptional situation arising and the files being saved, a certain time necessarily elapses in which the file contents may be changed. Hence, the consistency of the data in terms of the exceptional state which is to be documented is not ensured.

Previous solutions for recording a situation are limited to an index file in which an error number and possibly a few additional items of data are stored at the instant of an error. Although this information describes the error situation, it does not describe the entire profile of the situation, which includes not only the data concerned in the program but also the files involved, so that error reproduction and reliable analysis using the index file are often not possible. Within the context of this description, an error is understood as meaning an exceptional condition on the basis of which—for whatever reasons—it appears appropriate at least to interrupt, if not to terminate, the program, e.g. on account of an error situation in the narrower sense (the program cannot be continued), when a parameter structure which is not envisaged during program execution or is classed as not being possible arises, if inconsistent operating data are discovered etc.

U.S. Pat. No. 5,790,777 describes a computer system analysis device in which, in the case of a system error, a dedicated section of the system produces a crash dump file. Another system section is provided in order to produce a device file representing a memory profile during system operation. In the event of a system error, these files and a kernel file are accessed for the purposes of system analysis. Another system section is used to search for data which is requested for system analysis. The computer system in this document thus contains a number of system sections for performing system analysis which are distinguished from the actual system section which is subject to the analysis.

It is, therefore, an object of the present invention to consistently and completely record the data state of a data processing system for an exceptional situation arising on this system.

SUMMARY OF THE INVENTION

This object is achieved by a method of in which, according to the teachings of the present invention, a recording module is called by the triggering program and receives information from the latter regarding which data sets need to be treated as relevant data sets for creating the recording copy and creates a recording copy of the content of the at least one relevant data set via at least read access to the at least one relevant data set, the recording copy being in a form which permits transfer to another data processing system independently of the triggering program.

Such a recording module may, in particular, be produced independently of the triggering program and, thus, may be called by a number of triggering programs. This solution permits an interfile, consistent snapshot of the entire surroundings of the triggering program at the instant of the error or of the exceptional condition. The level of control required from the user is thus reduced, since he now need only occupy himself with the recording copy; in particular, he no longer has the bother of determining which files are, in fact, relevant. Often, files which are of no significance and thus act simply as "ballast" are also stored in this case, of course. The personnel analyzing the error obtains a consistent and complete picture of the exceptional situation. This increases the rate of errors being found and results in the programs and the associated file and data structures being corrected more quickly.

One advantageous embodiment of the present invention is used for dealing with the case of an error in program execution. In this case, the exceptional situation is an error situation for data in a data set and/or for the program execution of the triggering program or of a program associated with the latter.

In order to make handling a simple matter, it is beneficial if the recording copy is created in the form of an individual file.

It is likewise beneficial if a data compression method is used for creating the recording copy.

In another beneficial embodiment of the present invention, additional information supplied by the triggering program is incorporated into the recording copy. This information is used, for example, for documenting the error state beyond the recorded data sets.

In this context, it is beneficial if the recording module receives the information relating to the relevant data sets in a prescribed data set.

In addition, it is advantageous for obtaining a consistent data profile if the relevant data sets are blocked for write access operations on account of the exceptional situation, and this block is not removed before the recording copy has been completed.

Additional features and advantages of the present invention are described in, and will be apparent from, the following Detailed Description of the Preferred Embodiments and the Drawings.

DESCRIPTION OF THE DRAWINGS

FIG. 1 shows a schematic overview of the components and files involved in connection with the present invention.

FIG. 2b shows a flowchart of the execution of the data interchange program administered by the application program in FIG. 2a; and FIG. 2c shows a flowchart of the situation recording by the recording module according to the present invention.

DETAILED DESCRIPTION OF THE PREFERRED EMBODIMENTS

Figure 2A:
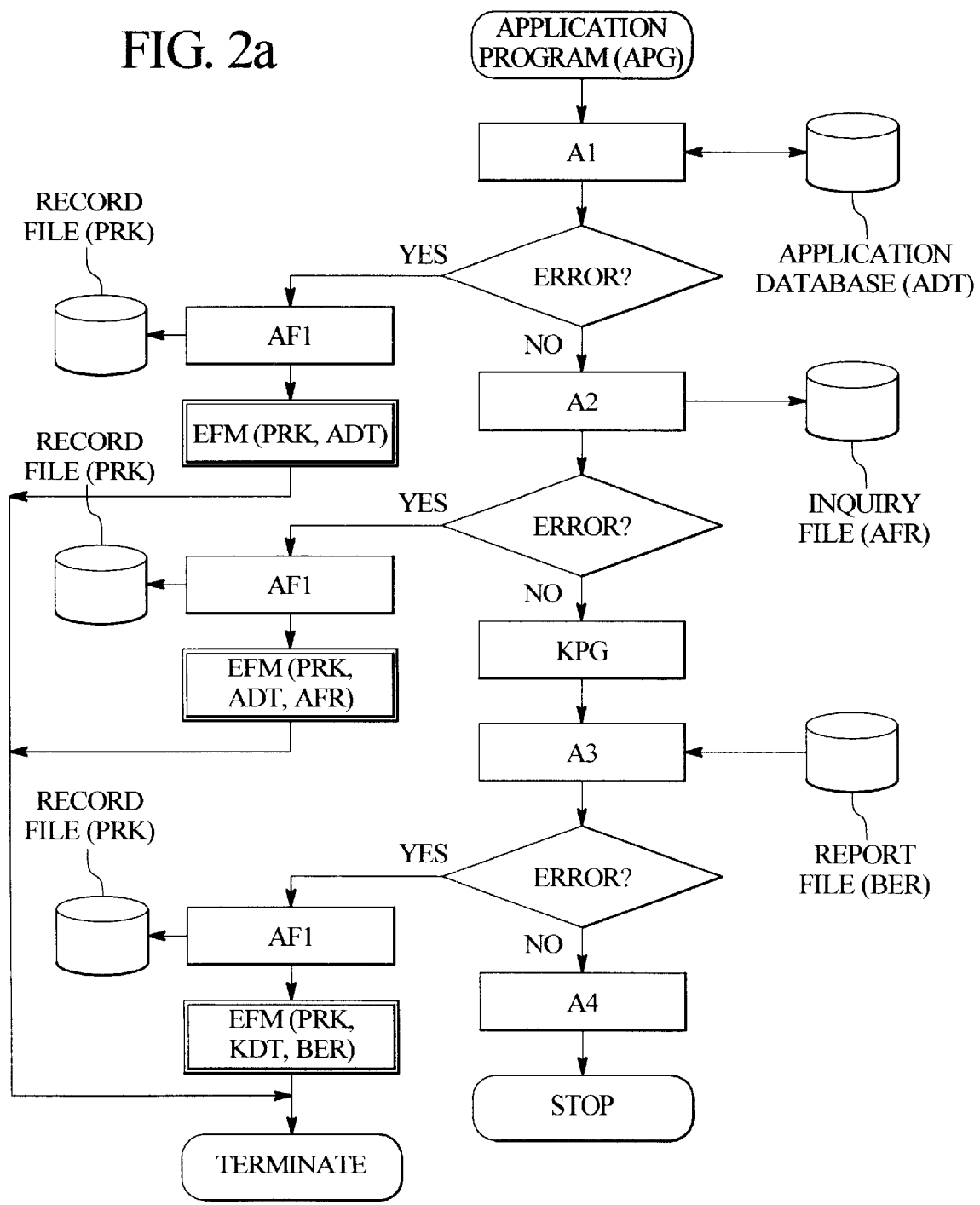
FIG. 2a shows a flowchart of the execution of an application program in which the method according to the invention is used.

In the Figures, arrows with thin lines represent read and/or write access operations (in each case on the basis of the arrow direction) to data sets, the arrows shown with thick lines show the flow of commands in the flowcharts, and the arrows with a double line symbolize calls to a subprogram.

It should be noted at this juncture that the illustrative embodiment portrayed in this case is used only for the purposes of illustrating the present invention. In particular, the type and use of the data are dependent on the individual embodiment and are not significant to the present invention as such. Nor are the type and design of the data processing system in which the present invention is implemented significant to the present invention. The data processing system may be, by way of example, a computer or a complex data processing installation linked via a network. As the person skilled in the art will immediately recognize, both simpler and more complex embodiments of the present invention are conceivable, and, in particular, the number of files generally, data sets used can fluctuate greatly on the basis of the application example.

With reference to FIG. 1, an application program APG providing a user interface for the user as a main program is set up on a data processing system. In particular, the application program APG receives data, such as administration data, from the user and outputs information to the user. The application program APG uses an application database ADT for storing the processed data. In most cases, the database ADT is a file on a data memory in the system, but it also may be associated with a dedicated storage medium or may occupy a defined subarea of a memory, e.g., an address area in a permanent memory or a (stipulated or changeable) section on a magnetic tape.

The application program APG uses a communication program KPG to interchange data with other users or data processing systems; for example, over a computer network (not shown in FIG. 1) or other data lines. The communication program KPG administers the communication parameters required for data interchange in a dedicated parameter file KDT. For administration of the data in the parameter file KDT, this data can be written or read only indirectly from the main program APG via the communication program KPG. The interface used for writing the data is an inquiry file AFR containing the parameter data transferred from the application program APG to the communication program-, and also any commands. For reading, a report file BER is used which is both set up for the execution report regarding the read/write operation for the parameter file KDT and can thus be evaluated by the application program for errors (or other execution shortfalls) when administration is performed by the communication program.

If an error or another extraordinary situation arises in the application program APG, then, according to the present invention, an appropriate error identification operation is carried out and, on the basis of the accompanying circumstances, an explanatory text is written to a record file PRK, and a recording module EFM is called with the names of the files which are to be saved in order to produce a recording copy EFK of these files. Beneficially, after the occurrence of the error, the files or data sets concerned are blocked for write access operations, which can change the data content which is to be documented, of course, until the recording copy EFK has been completed. In the illustrative embodiment considered in this case, the recording module EFM is produced as a software program activated by the triggering application program APG via a system call, for example, and receives, via the parameters of the system call, information about which files need to be stored.

The recording module EFM is called at the instant at which the error occurs. The calling program has the information available about the files which are relevant to the error and which, of course, may be different on the basis of the error situation, and transfers a parameter list containing these very file names to the module EFM. The recording module EFM itself is independent of the application program APG and the program environment AUG associated with it. In particular, the number and type of files or data sets which are to be saved are arbitrary.

Errors may arise at various points in the execution of a program APG,KPG. In the flowcharts in FIG. 2, for reasons of clarity, only those steps which are of importance for recording a situation within the context of the present invention are shown. Of particular interest in this context are such errors as may arise when the databases ADT,KDT are written. The possible causes of error are multifarious and depend by nature on the individual instance of application; examples being an incorrect input format, impermissible duplication of data in a database or the like. Such errors or exceptional situations can be reproduced only on the basis of the knowledge of the contents of the data sets involved. The present invention permits complete documentation in this case.

Figure 2B:
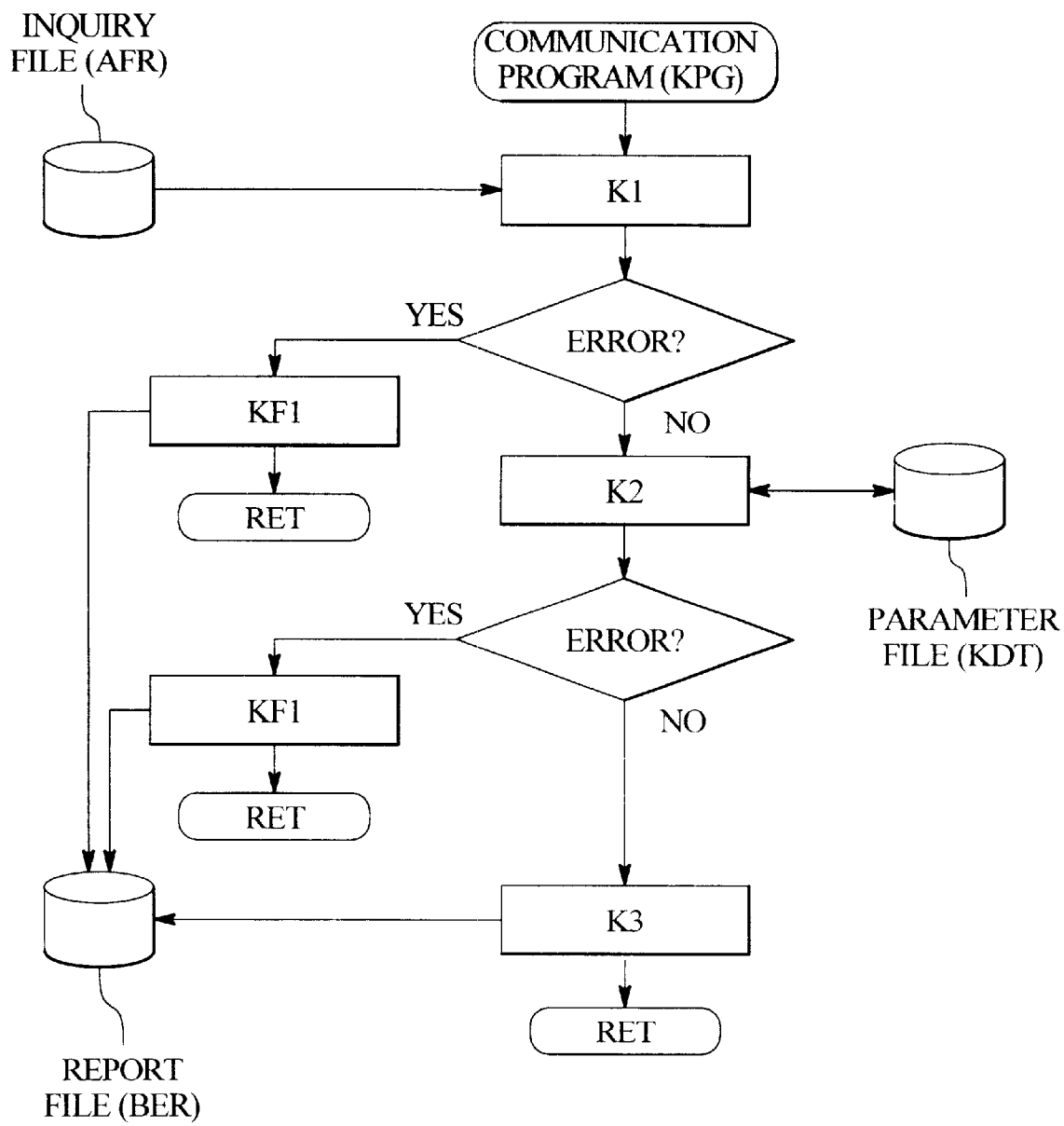

FIGS. 2a and 2b show simplified flowcharts for the administration of the communication parameters, and FIG. 2a shows the flowchart for the main program APG. The application program APG is started by the user. In the first step A1, it receives the inputs from the user and links them to the data in the database ADT. The more precise operations in step A1 and, accordingly, in the further steps A2 . . . A4 are of no importance for the present invention, which is why they will not be discussed in more detail here.

If, during the execution of step A1, an error (or, in general, an exceptional situation) arises, then the procedure branches to an error handling operation. In step AF1, the type of error is written to a record file PRK, for example using an error number and a description of the error in text form. In addition, the specifications of the "relevant data sets", i.e. of the data sets which are to be saved when the situation is recorded, also may be stored in the record file. The recording module EFM is then called, the call also containing the list of the data sets which are relevant for the current exceptional situation. As described further below with reference to FIG. 2c, the relevant data sets, in this case the record file PRK and the database ADT, are now saved. Provided that it is not possible or appropriate to resume program execution, the application program is then ended in a termination with an error message.

After successful completion of step A1, and using the data handled therein, that data which is intended for the communication program KPG is created in the form of an inquiry file AFR in step A2. Provided that step A2 is executed without errors, the communication program KPG is then called symbolized by a rectangle with a double border, and then processes the communication parameters as specified in the inquiry file AFR.

With reference to FIG. 2b, the communication program KPG reads in the inquiry file AFR in step K1 and checks it. In the next step K2, the communication parameters KDT are processed on the basis of the instructions taken from the inquiry file AFR. Finally, in step K3, a report about the processing which has taken place is created and is stored in the report file BER, and execution is returned to the application program in a return command Ret. Again, further details of the operations in the individual steps of the communication program are of no importance for the present invention.

If an error arises in one of the steps K1,K2 of the communication program KPG, this is noted in an appropriate branch KF1 in the report file BER, and the communication program KPG, in turn, returns to the application program. As is evident, the communication program KPG is not designed to call situation recording in the event of an error. This may be the case, for example, because the communication program KPG is an additionally purchased program with no possibility of intervention in its error handling. In this case, as shown here, the situation is recorded by a superordinate program, in this case the application program APG.

Again with reference to FIG. 2a, after execution of the communication program APR has been returned to the application program APG, the report file BER is read in and evaluated in step A3. Provided that no error has been established in step A3, completion processing with an appropriate message to the user then takes place in step A4, and the application program ends its execution.

If an error, which also includes an error documented via the report file BER in the subprogram KPG, is established in step A2 or A3, then the type of error is written to the record file PRK in a similar manner to an error in step A1 as described above, and the recording module EFM is called to execute the operations described below. In this context, the list of relevant data sets denotes different data sets on the basis of the respective exceptional situation in question; this is indicated in FIG. 2a by the different lists PRK,ADT,AFR and PRK,KDT,BER. The application program is then ended in a termination with an error message.

FIG. 2c shows the operations on the part of the recording module EFM when creating a recording copy EFK in accordance with the present invention. After starting, the recording module EFM determines, in step E1, which files are selected as "relevant data sets"; i.e., need to be saved when recording the situation. By way of example, this information is transferred to the recording module in the call parameters. Another option is for a list of the relevant files to be present in a record file PRK created by the triggering program APG and to be read in by the recording module EFM in step E1.

In the next step E2, the contents of the relevant data sets determined in step E1 are now read in and a recording copy EFK is generated from them. This can be done using known data backup methods, for example. In addition to the contents of the relevant files, provisions also may be made for the storage of other information; for example information transmitted to the recording module EFM with the command call.

The recording copy EFK is advantageously generated in the form of a single file, even if there are originally a plurality of relevant data sets. A further improvement in the method of the present invention can be obtained by compressing the data size. In addition, the content of the recording copy EFK can be protected against unauthorized access operations using a known encryption method.

Finally, the recording module outputs a message to the user in step E3 in order to inform him that a recording copy has been created on account of an error or, generally, an exceptional situation and that this recording copy needs to be sent for example, to the manufacturer of the application program APG for the purpose of evaluating the exceptional situation. Insofar as provisions are made for this, the recording copy can be copied to a transportable data medium or else can be sent to the evaluation site via a data link, e.g. over the Internet, following an appropriate command from the user.

The recording copy EFK then contains the information regarding the exceptional situation, which has caused the recording copy to be created, in a form which readily allows it to be forwarded for the purposes of error documentation and error analysis. By reversing the creation operation, the recording copy EFK can be converted back into the original data sets again at any desired instant; for example, in order to be able to control the exceptional situation exactly.

The recording module EFM may, as described above, be a module which is independent of the application program APG and its application environment AUG in the data processing system considered. Similarly, it could be stored as a program routine in a subprogram library, from where it can be linked into appropriate application programs.

However, the recording module EFM equally may be produced as a hardware unit; e.g., using a dedicated processor which is at least able to have read access to all the data media in the data processing system and which is activated by a command signal triggered by the application program APG in order to create a recording copy EFK. In this case, it should be kept in mind that the data sets to be saved should be blocked for write access operations for the time during which the recording copy EFK is being created, in order to obtain consistent documentation of the exceptional situation.

In this variant, recording may take place independently of other processes in the data processing system. In this context, the recording module EFM receives the information about which data sets need to be stored; for example, in a message with the command signal or via an additional command file which is read in by the recording module EFM at the start of situation recording. The command file used may, by way of example, the aforementioned record file PRK. In this case, the message or command file is expediently saved to an equal extent as a component part of the recording copy.

Although the present invention has been described with reference to specific embodiments, those of skill in the art will recognize that changes may be made thereto without departing from the spirit and scope of the invention as set forth in the hereafter appended claims.

What is claimed is:

1. A method for recording a data state in a data processing system in which at least one program is executed and, in this context, at least one data set within at least one data memory is accessed, the method comprising the steps of:

obtaining in a triggering program an exceptional situation determined by prescribed characteristics;

selecting on the basis of a prescribed rule at least one relevant data set which is at least indirectly affected by an access operation by the triggering program and is intended for subsequently deducing circumstances leading to the exceptional situation;

calling a recording module by the triggering program;

receiving, at the recording module, information from the triggering program regarding which of the data sets need to be treated as the at least one relevant data set; and creating, via the recording module and based on the received information, a recording copy of content of the at least one relevant data set via at least read access to the at least one relevant data set, the recording copy being in a form which permits transfer to another data processing system independently of the triggering program.

2. A method for recording a data state in a data processing system as claimed in claim 1, wherein the exceptional situation is an error situation for at least one of data in a data set, program execution of the triggering program, and program execution of a program associated with the triggering program.

3. A method for recording a data state in a data processing system as claimed in claim 1, wherein the recording copy is created in an individual file form.

4. A method for recording a data state in a data processing system as claimed in claim 1, wherein a data compression method is used for creating the recording copy.

5. A method for recording a data state in a data processing system as claimed in claim 1, wherein additional information supplied by the triggering program is incorporated into the recording copy.

6. A method for recording a data state in a data processing system as claimed in claim 1, wherein the recording module receives the information relating to the relevant data sets in a prescribed data set.

7. A method for recording a data state in a data processing system as claimed in claim 1, the method further comprising the step of:

blocking the relevant data sets for write access operations based on the exceptional situation, the relevant data sets remaining blocked until creation of the recording copy has been completed.

* * * * *